(12) United States Patent
Kim

(10) Patent No.: US 7,101,476 B2
(45) Date of Patent: Sep. 5, 2006

(54) SOIL COVERED ENVIRONMENTALLY AFFIRMATIVE HOUSEHOLD SEWAGE TREATMENT SYSTEM

(76) Inventor: Jung Yong Kim, 1376-1, Yong Bong-Dong, Buk-Ku, KwangJu (KR)

( * ) Notice: Subject to any disclaimer, the term of this patent is extended or adjusted under 35 U.S.C. 154(b) by 67 days.

(21) Appl. No.: 10/890,867

(22) Filed: Jul. 15, 2004

(65) Prior Publication Data

US 2006/0011559 A1    Jan. 19, 2006

(51) Int. Cl.
*C02F 3/00*    (2006.01)
(52) U.S. Cl. .............. 210/151; 210/170; 210/195.1; 210/602; 210/903
(58) Field of Classification Search ........... 210/150, 210/151, 170, 195.1, 602, 605, 747, 903
See application file for complete search history.

(56) References Cited

U.S. PATENT DOCUMENTS

| | | | | |
|---|---|---|---|---|
| 4,218,318 A * | 8/1980 | Niimi et al. ............... | 210/150 |
| 4,415,450 A * | 11/1983 | Wolverton ................. | 210/151 |
| 4,465,594 A * | 8/1984 | Laak ........................ | 210/903 |
| 4,824,572 A * | 4/1989 | Scott ........................ | 210/170 |
| 4,904,386 A * | 2/1990 | Kickuth .................... | 210/602 |
| 5,078,882 A * | 1/1992 | Northrop .................. | 210/602 |
| 5,156,741 A * | 10/1992 | Morrison et al. .......... | 210/602 |
| 5,486,291 A * | 1/1996 | Todd et al. ................ | 210/747 |
| 5,549,817 A * | 8/1996 | Horsley et al. ............ | 210/170 |
| 5,733,453 A * | 3/1998 | DeBusk .................... | 210/170 |
| 6,277,274 B1 * | 8/2001 | Coffman ................... | 210/150 |
| 2003/0070972 A1 * | 4/2003 | Kim .......................... | 210/170 |

* cited by examiner

*Primary Examiner*—Christopher Upton
(74) *Attorney, Agent, or Firm*—Eugene Oak

(57) ABSTRACT

A soil covered sewage treatment system for eliminating organic impurities from a household sewage is provided. The house hold sewage treatment system is covered with 1) a top layer planted with grasses and flowers of the local area, 2) a second top layer filled with the local soil, and 3) a third layer from the top that is divided into six sections and each section is separated from each other by walls that are extended from each baths and is filled with chips of stones and marbles. The sewage treatment system is comprised of; a decanting and denitrification bath, a primary oxidation bath, a decanting bath, a secondary oxidation bath, and a discharging bath with partial recycling pipes which are buried under the third layer. Microorganisms living in the local soil facilitate denitrification and oxidation of a household sewage. The roots of grass covering the top surface of the reaction baths absorb and utilize water, impurities, and decomposed compounds as fertilizer. Baths covered with normal garden vegetations and flowers endow environmentally pleasant view.

1 Claim, 4 Drawing Sheets

SOIL COVERED ENVIRONMENTALLY AFFIRMATIVE HOUSEHOLD SEWAGE TREATMENT SYSTEM

The present invention relates to an environmentally affirmative household sewage treatment system decomposing hydrocarbons, nitro compounds, and phosphorous compounds in a household sewage with vegetation, plants and microorganisms living in local soil. All structures of the system are buried underground and covered with grass and flowers to provide a pleasant view.

BACKGROUND OF THE INVENTION

1. Field of Invention

The present invention relates to a more environmentally affirmative system structure for treating household sewages. Aerobic and anaerobic bacteria living in the local soil decompose hydrocarbons, nitro-compounds, and phosphorous compounds in a household sewage. Worms living in the soil digest these decomposed harmful material. Grass and flowers covering the reaction bath along with microorganisms and worms biologically decompose these harmful materials eventually to be used as fertilizer.

2. Description of the Prior Art

Microorganisms and bacteria have been widely used for sewer treatment. Typical treatment scheme includes use of primary settlers, bio filters, aeration tanks and secondary settlers. U.S. Pat. No. 6,217,759 to Kolesnikov, et al. teaches of a device for biochemical sewage treatment, containing biocoagulators to provide oxidation of the sewage nitrogen compounds utilizing bio stimulating effect of a He—Ne laser (HNL).

U.S. Pat. No. 6,200,472 to Donald, et al. illustrates a use of single 'Three Stage Sewage Treatment System' made of fiberglass-reinforced plastics. The effluents from the process are chlorinated and stored for discharge. U.S. Pat. No. 6,177,007 to Lee, et al. teaches to install plurality of aerobic and anaerobic tanks, communicating each other to minimize the sludge wash out from anaerobic tank. U.S. Pat. No. 5,843,305 to Kim, et al. teaches to provide a media in a honeycomb type layer arrangement for even distribution of water and sewage, for effective adherence of microorganisms. Microorganisms activating at ambient temperature ranges were selected for commercial applications.

U.S. Pat. No. 4,218,318 to Niimi et al. illustrates a waste water treatment system having a surface layer connected to the bottom conduit (9) by pores between the soil and marvels but does not have separated decanting bath nor oxidation bath. U.S. Pat. No. 4,824,572 to Scott's illustrates a wastewater treatment having a bath consists of bottom concrete (20), small gravel layer (26), larger gravel layer (28), hay or straw layer (32), and high quality top soil (34). The wastewater passes through the voids of the gravel layers. U.S. Pat. No. 4,904,386 to Kickuth is more close to Scott's. Waste water just pass through a bed of soil, gravel and plants. U.S. Pat. No. 4,465,594 to Laak is to utilize filters of stone and sand. Septic tanks separate solid materials. No decanting of solid material is executed after the nitrification step. In U.S. Pat. No. 6,277,274 to Coffman, waste water pass through a plant/soil filter first. Solid materials are screened by the soil mixture (11) and plants (13) contained in the first, water proof, chamber (15). Only liquid pass down to second chamber (39) down under through a vertical pipe line (27). U.S. Pat. No. 5,733,453 to DeBusk is more like Scott's system. U.S. Pat. No. 5,549,817 to Horseley is rather a filtration system than a decomposing organic materials or nitrification system. In U.S. Pat. No. 5,156,741 to Morrison, only liquid dispersing pipes (22) and aeration pipes (20) pass through the bed (10) packed with media (18). In U.S. Pat. No. 5,486,291 to Todd and U.S. Pat. No. 4,415,450 to Wolverton, the wastewater is introduced to the bottom layer, packed with coarse and porous mass barrier of rocks, to discharge to the environment. No special stay in "bath" for neither aeration nor nitrification is installed.

In all of the previous technology, bacteria were artificially embedded into a closed vessels equipped with vent lines. Appearances of those vessels are not environmentally pleasing, as they appear as chemical plants.

SUMMARY OF THE INVENTION

It is the object of this invention to provide a new small to medium size system for treating household sewages more environmentally affirmative way while providing a pleasant views. The soil covered waste treatment of the current application eliminates organic impurities such as hydrocarbons, nitro compounds, and phosphorous compounds from a household sewage. The waste water treatment system is for treatment of household sewage of BOD less than 500 ppm, having treatment capacity less than 100 MT/day, geometrical volume in the range of 1 to 100 $m^3$. The waste treatment system is covered with; a top layer planted with grasses and flowers in the area, a second top layer filled with the local soil with the depth of 1 m, and a third layer from the top that is divided into six sections and each section is separated from each other by walls that are extended from each baths and is filled with chips of stones and marbles of size of 10 to 15 mm in diameter, the bottom of the third layer from the top of the structure is supported by grids. The waste water treatment system of the current application is comprised of, a decanting and denitrification bath, a primary oxidation bath, a decanting bath, a secondary oxidation bath, and a discharging bath with partial recycling pipes that are buried under the third layer. Microorganisms living in the local soil facilitate denitrification and oxidation of a household sewage. The roots of grass covering the top baths absorb and utilize water, impurities, and decomposed compounds as fertilizer.

No artificial chemicals or specific bacteria are utilized. Effluent from this soil treatment system is odorless, colorless, and adequate to be used as living water such as sprinkler water, toilet, and car washing water.

DETAILED DESCRIPTION OF THE PREFERRED EMBODIMENTS

Figure 1:
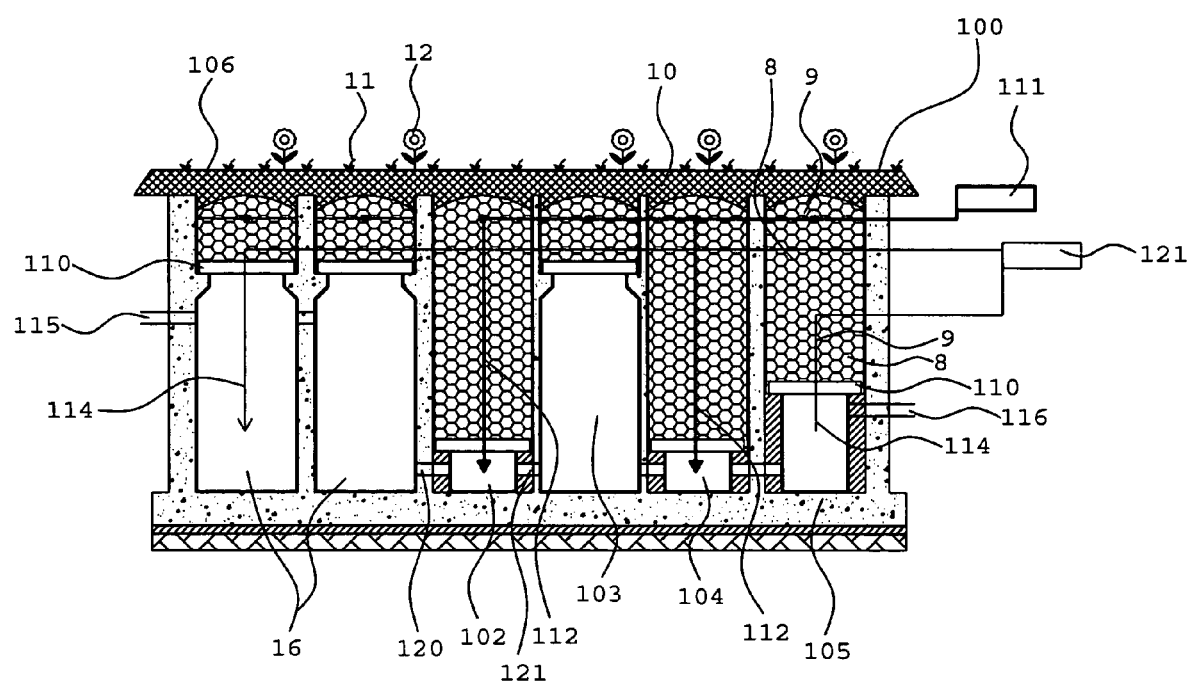
FIG. 1 is a schematic representation of overall structure of this invention.

FIG. 1 is the schematic sketch of the system structure of the current application buried underground. The grass (11) and flowers (12) cover the surface, providing a pleasant view. The sewage treatment system (100) is covered with local soil (10). Packing material (9) between the soil (10) and support (110) is a mixture of marbels and stone of diameter 10 to 15 mm. The packing material is wrapped with a net (8). Wastewater is introduced to a decanting and de-nitrification bath (16) of the sewage treatment system (100) through an inlet pipe (115). Effluent from the decanting and de-nitrification baths (16) is transferred to a primary oxidation bath (102) through a hole (120) at the wall. Air is introduced to a primary oxidation bath (102) by an air pump (111) and through air pipe (112). Effluent from the primary oxidation bath (102) is decanted again in a decanting bath (103) and transferred to a secondary oxidation bath (104) through another hole (121) at the wall between decanting bath (103) and secondary oxidation bath (104). Effluent from the secondary oxidation bath (104) is transferred to a discharging bath (105) and released to environment through discharge pipes (116). A part of treated wastewater in the discharging bath (105) is recycled to the decantation and de-nitrification bath (16) by the recycle pump (121) through recycle line (114) to remove residual nitro compounds.

Figure 2:
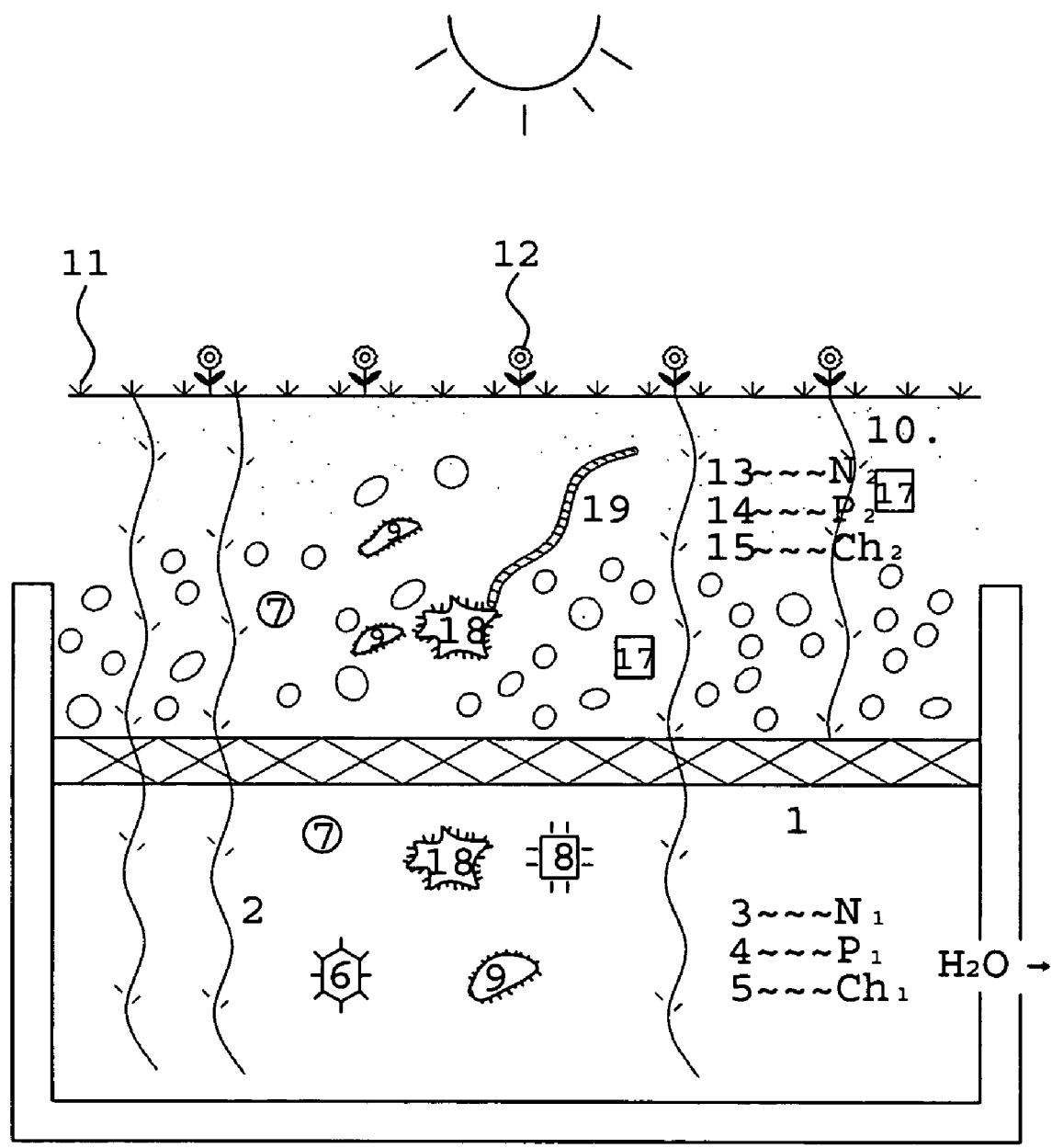
FIG. 2 is a schematic drawing showing structure materials, microorganism, plants, and their relationship within the system.

FIG. 2 is a schematic drawing showing structure materials, microorganism, plants and their relationship in the structure. When sewage (1) is introduced into the primary decanting and denitrification bath (16), the anaerobic microorganisms (6,7) living in the local soil and adhered to the roots (2) of the grass (11) and flowers (12) decompose the nitro compounds and produce nitrogen. Hydrocarbons (5) are easily decomposed and digested by microorganisms (8) in the sewage and soil. Phosphorous compounds (4) are digested by phosphorous accumulating organisms (PAOs) (9) in the aerobic bath (16). Protozoa (18) digest the PAOs and these protozoa are good food of the earthworm (19). Volatile compounds (13,14,15) from baths, making objectionable odors, are adsorbed onto the local soil (10) and decomposed by microorganisms (17) and become fertilizer for the plants.

Figure 3:
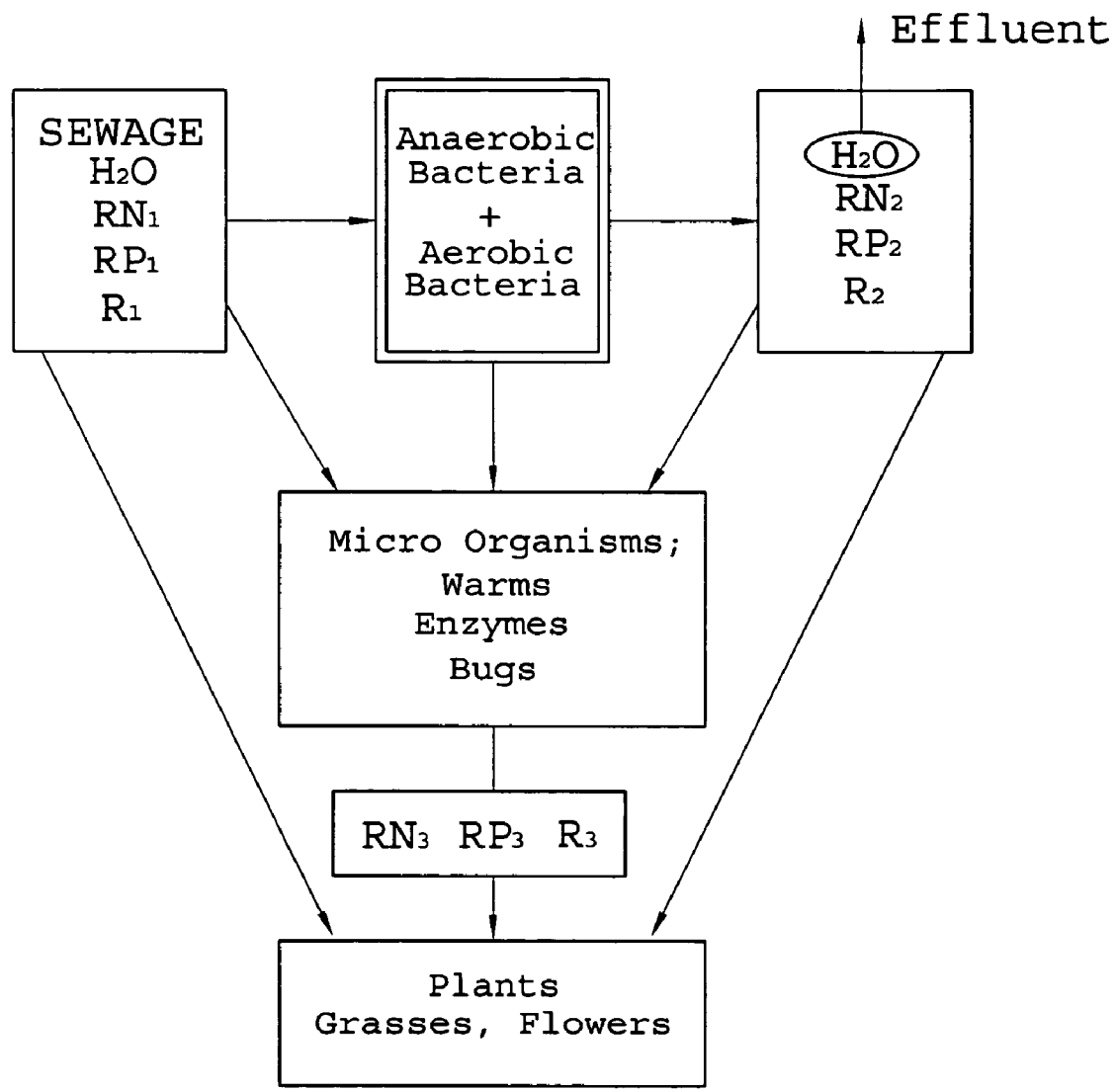
FIG. 3 is a schematic diagram of metabolic mechanisms of microorganisms and plants living in the system of this invention.

FIG. 3 is a schematic diagram of metabolic mechanisms of microorganisms and plants. All materials in the sewage can be used as fertilizer for the plants covering the top local soil while they are exposed to a decomposition step by the microorganisms in the baths. The first products from the decomposition steps are utilized as fertilizer for the grass. The earthworm and microorganisms in the soil digest the first products. Dead bodies of microorganisms are consumed as fertilizer for the plants.

Figure 4:
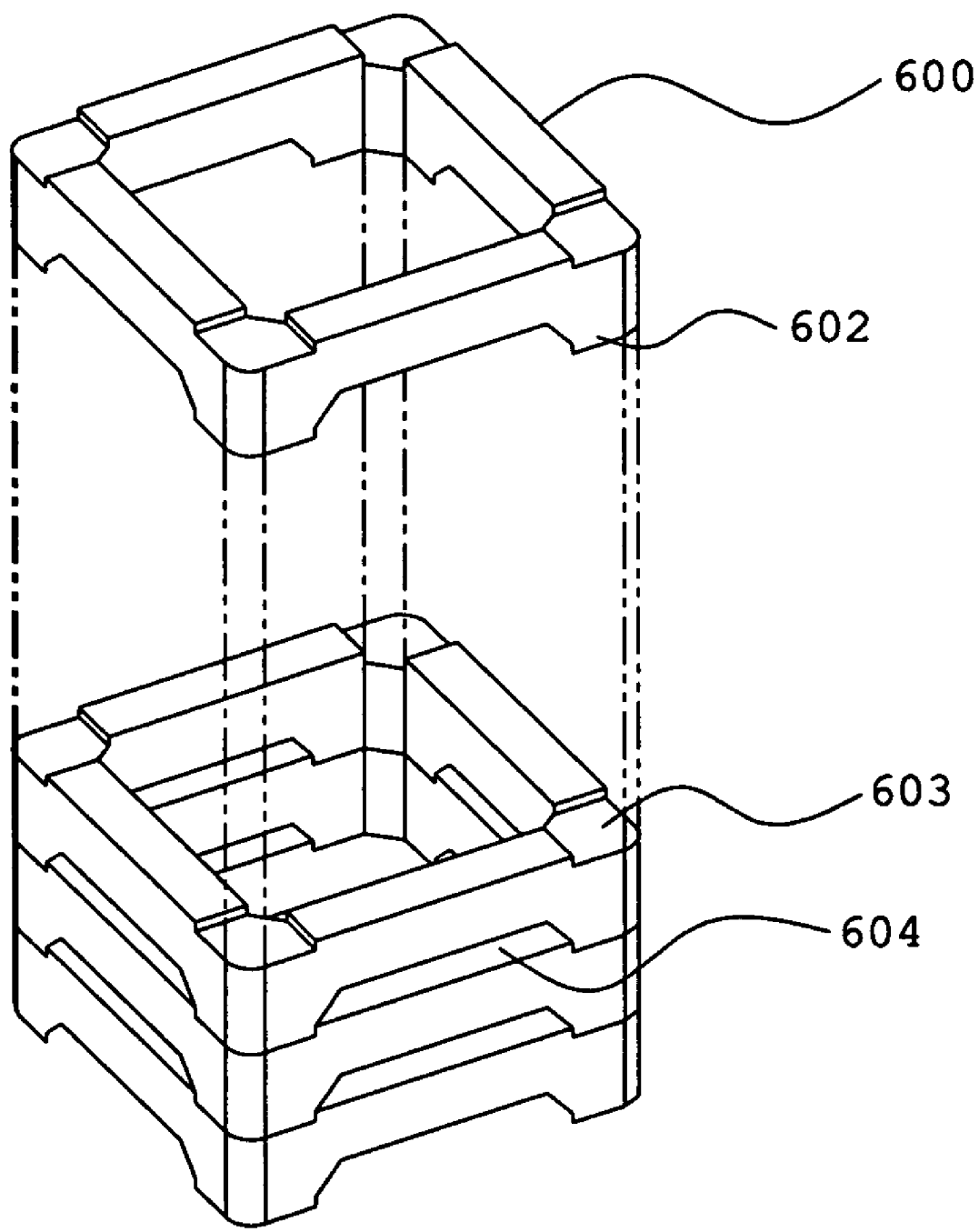
FIG. 4 is a perspective view of manhole barrier blocks of another embodiment of the current application.

FIG. 4 is a perspective view of manhole barrier blocks for each reaction baths of another embodiment of the current application. The manhole block (600) has legs (602) and grooves (603). Simply piling up the blocks (600) makes baths of (16), (102), (103), (104) and (105) between which the sewage can move freely through the void (604).

What is claimed is:

1. A soil covered sewage treatment system, which is covered with;
   a top layer planted with grasses and flowers of the local area, and
   a second top layer filled with the local soil, and
   a third layer from the top that is divided into six sections wherein each section is separated from each other by walls forming a plurality of baths and is filled with chips of stones and marbles, said baths comprising;
   an initial decanting and denitrification bath,
   a primary oxidation bath, wherein air is introduced through air pipe by an air pump,
   the initial decanting bath,
   a secondary oxidation bath, wherein air is introduced through air pipe by an air pump, and
   a discharging bath with a partial recycle to the decanting and denitrification bath.

* * * * *